Figure 1:
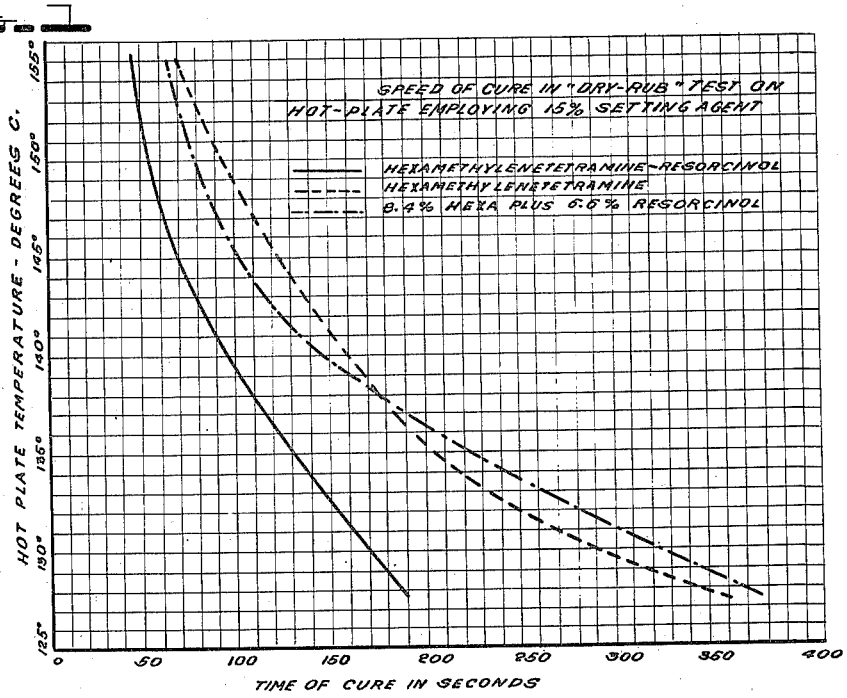

INVENTOR.
PHILIP H. RHODES,
BY
ATTORNEY

Patented Jan. 14, 1947

2,414,416

UNITED STATES PATENT OFFICE 2,414,416

METHOD OF SETTING PHENOL-ALDEHYDE RESINS AND PRODUCTS DERIVED THEREFROM

Philip H. Rhodes, Butler, Pa., assignor to Pennsylvania Coal Products Company, Petrolia, Pa., a corporation of Pennsylvania Application October 30, 1943, Serial No. 508,445

11 Claims. (Cl. 260—54)

This invention relates to the curing or setting of monohydric phenolic resins, and especially phenolic-aldehyde resins of the permanently fusible type, said resins being also known as two-stage phenolic-aldehyde resins.

In its more specific aspect, the present invention is directed to the setting, hardening, and curing of the phenolic resins of the character herein set forth in the presence of the chemical addition compound of hexamethylenetetramine and resorcinol, $C_6H_{12}N_4 \cdot C_6H_4(OH)_2$.

The utilization of the chemical addition product of hexamethylenetetramine and resorcinol in the setting of phenolic resins enables the curing to be carried out at a temperature as low as 135° to 140° C., and the time of cure may be reduced as much as 50% from the time now required to cure and harden permanently fusible resins utilizing a methylene-containing curing agent such as hexamethylenetetramine, paraform, and the like. Stated differently, when the chemical addition product of hexamethylenetetramine and resorcinol is compounded with phenolic resins of the type herein described, in substitution for the usual methylene setting agent, it is possible to achieve a cured molded article in considerably shorter time periods than are now used in the art, and simultaneously said faster cures may be attained at substantially lower temperatures than commonly employed in the art.

While the chemical addition products of hexamethylenetetramine with various phenols are known, and their preparation has been set forth by Harvey and Baekeland, appearing in the Journal of Industrial and Engineering Chemistry, vol. 13, No. 2, pp. 135–141, 1921, it is novel to use the hexamethylenetetramine-resorcinol addition product as a high speed setting agent, and the results obtained by such use are completely unexpected and unique in the art. The setting agent of the present invention, namely, the chemical addition product of hexamethylenetetramine and resorcinol, in its preferred form, is anhydrous, so that it may be stored for long periods of time at temperatures up to 100° F. without decomposition and in this manner the effectiveness of the chemical addition product as a setting agent is uniformly maintained.

In order to cure phenolic resins in accordance with the present invention at a temperature as low as 135° to 140° C. in a relatively short time, it is desirable that the setting agent of the present invention, namely, the chemical addition product of hexamethylenetetramine and resorcinol having the properties herein set forth, be present in the phenolic resin compound to be cured, as, for example, a phenol-foraldehyde resin compound, in a proportion varying from 12 to 18%, and preferably 14 to 16%, taken on the weight of the complete phenolic resin compound containing the setting agent. For example, for each 100 parts of the phenolic resin compound which is to be cured, the two-stage phenolic resin preferably comprises 84 to 86 parts by weight, while the setting agent preferably comprises 16 to 14 parts by weight.

In view of the above, it is the primary object of the present invention to cure permanently fusible monohydric phenolic resins in a much shorter time and at a much lower temperature than heretofore has been known, said advantageous curing being accomplished by the use of the chemical addition product of hexamethylenetetramine and resorcinol.

It is well known to prepare phenolic molding compounds by blending a two-stage phenolic resin, a methylene-containing setting agent therefor, fillers, lubricants, dyes and accelerators, compounding the blended mixture on heated rolls for definite time periods at predetermined temperatures, and then grinding the sheeted, compounded mass to a desirable particle size. The ground resin is then suitable for molding at a temperaure of 150° to 170° C., and higher, as is well known in the art.

The advantageous character of the chemical addition product of hexamethylenetetramine and resorcinol will be understood from the following experiment: A standard brittle two-stage phenolic resin was prepared by reacting .85 mols of formaldehyde with 1 mol of phenol in the presence of 2% of oxalic acid crystals functioning as a catalyst. Thereafter, the resin was split into several portions, and to one portion there was added hexamethylenetetramine; to another portion, the chemical addition product of hexamethylenetetramine and resorcinol; to another portion, the chemical addition product of hexamethylenetetramine and catechol; to another portion the chemical addition product of hexamethylenetetramine and hydroquinone; to another portion, paraform; and to another portion a mechanical mixture of 6.6% resorcinol and 8.4% hexa, these components being mechanically blended with the resin in the same proportion as they occur in the chemical addition product of hexamethylenetetramine and resorcinol. These various setting agents were incorporated in the phenolic resin in each case in an amount equal to 15% taken on the weight of the resin compound, said resin compound including the setting agent. Each portion of phenolic resin, after being ground and blended with its setting agent, was cured by the dry rubbing method on a hot plate at temperatures varying from about 125° C. to about 155° C.

The results obtained employing the various setting agents are set forth in the following table:

Table I

| Hot plate, temp. | Time required to set using 15% setting agent on resin wt. | | | | | |
|---|---|---|---|---|---|---|
| | Hexa | Hexa resorcin | Hexa catechol | Hexa hydroquinone | Paraform | 6.6% resorcin 8.4% hexa |
| °C. | Seconds | Seconds | Seconds | Seconds | Seconds | Seconds |
| 127.5 | 375 | 190 | 370 | 405 | | 360 |
| 133 | 260 | 145 | 258 | 275 | About 1,800 | 230 |
| 139 | 155 | 104 | 165 | 180 | About 800 | 165 |
| 145 | 105 | 70 | 105 | 120 | About 700 | 120 |
| 150 | 80 | 57 | 75 | 95 | About 650 | 90 |
| 155 | 63 | 47 | 58 | 75 | About 600 | 70 |

Referring to the above table, it is to be noted that at comparatively low temperatures, that is, in the vicinity of 127.5° C., the setting agent comprising the chemical addition product of hexamethylenetetramine and resorcinol, is almost twice as fast as hexamethylenetetramine alone, and at 155° C. it is about 20% faster than hexamethylenetetramine alone.

It is also clear from an examination of the above table that the desired results are not obtained by a mechanically blended mixture of hexamethylenetretramine and resorcinol in the same proportion, but that it is necessary that the setting agent comprise the chemical addition compound of hexamethylenetetramine and resorcinol. From an examination of the last column of the table, it clearly appears that the mixture of hexamethylenetetramine and resorcinol, when employed in the same proportions as said ingredients, are employed in the chemical addition compound, offers no advantages over the use of hexamethylenetetramine from the standpoint of curing time, taken together with the temperature of cure. This also clearly appears from Fig. 1 which is a graph setting forth the speed of cure of three separate portions of a two-stage phenolic resin, one portion having added thereto 15% of the chemical addition product of hexamethylenetetramine and resorcinol; another portion having added thereto 15% of hexamethylenetetramine; and another portion having added thereto 15% of a mechanical mixture of hexamethylenetetramine and resorcinol.

Figure 2:
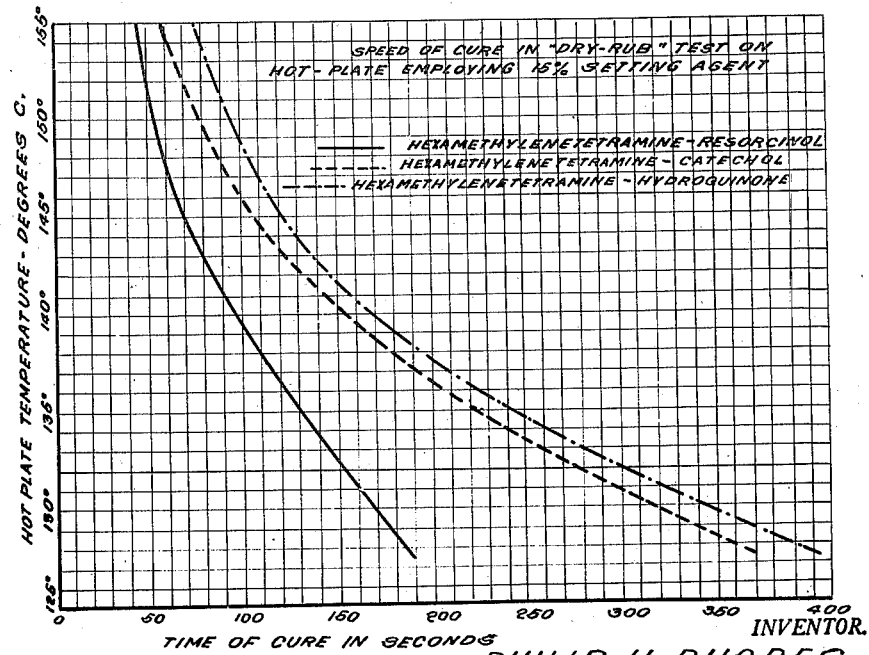

Figure 2 is a graph setting forth the speed of cure of three separate portions of a two-stage phenolic resin, one portion having added thereto 15% of the chemical addition product of hexamethylenetetramine and resorcinol; another portion having added thereto the chemical addition product of hexamethylenetetramine and catechol; and another portion having added thereto the chemical addition product of hexamethylenetetramine and hydroquinone.

Referring to the above table, it is desired to point out that the hexamethylenetetramine chemical addition product of resorcinol, that is, meta dihydroxy benzene, gives outstanding speed as a setting agent for two-stage phenolic resins compared to the hexamethylenetetramine chemical addition products of the other dihydroxy benzenes. More specifically, the chemical addition product of hexamethylenetetramine and resorcinol functions to set the resin compound much more quickly than the chemical addition product of hexamethylenetetramine and catechol, catechol being an ortho dihydroxy benzene, and the same holds true for the chemical addition product of hydroquinone, that is, para dihydroxy benzene and hexamethylenetetramine.

Referring to the article by Harvey and Baekeland, the hexamethylenetetramine-resorcinol compound described in said article was prepared by the old method of Moschatos and Tollens, said method in general comprising dissolving 2 grams of hexamethylenetetramine in 3 grams of water, and mixing the latter with 3 grams of resorcinol dissolved in 3 grams of water, to thereby produce a white crystalline addition product. This method has several disadvantages. The chemical addition product of hexamethylenetetramine and resorcinol may advantageously be prepared in accordance with the following, wherein two solutions, one a hexamethylenetetramine solution and the other a resorcinol solution, were prepared and thereafter mixed. The respective solutions were prepared as follows:

Solution A

| | Grams |
|---|---|
| Hexamethylenetetramine | 140 |
| Water | 500 |

Solution B

| | Grams |
|---|---|
| Resorcinol | 106 |
| Water | 400 |

The hexamethylenetetramine, which is a commercial product now on the market, is dissolved in 500 grams of water and preferably maintained at a temperature varying from 15° to 25° C. to thereby form solution A. The resorcinol is dissolved in 400 grams of water and also maintained preferably at a temperature of 15° to 25° C. to form solution B, said temperature being maintained within the range set forth for the reasons hereinafter pointed out. Solution A and solution B are then mixed, and a bulky, white, crystalline compound immediately forms. Equilibrium is reached in a period of about 10 to 15 minutes, and a slight settling of the crystalline precipitate may be observed. The crystals of the chemical addition product of hexamethylenetetramine and resorcinol may be separated from the mother liquor by any of the well known prior art methods, such as gravity filtration, filter presses, or by centrifuging, the latter giving the most economical and efficient results. The resulting crystalline chemical addition product of hexamethylenetetramine and resorcinol is then dried at a suitable temperature and for a suitable period until the addition product is substantially anhydrous. It is highly desirable to reduce the hexamethylenetetramine setting to a substantially anhydrous state, since it has been discovered that unless the chemical addition product of hexamethylenetetramine and resorcinol is dry, a reaction is initiated between the combined hexamethylenetetramine and resorcinol, with the evolution of ammonia. This decomposition of the setting agent decreases the effectiveness thereof when it is used to cure, set, and/or harden a phenolic composition. When properly dried, the hexamethylenetetramine-resorcinol setting agent of the present invention has excellent stability in storage at normal temperatures below 100° F. However, as the temperature increases above 100° F. the chemical addition product of hexamethylenetetramine and resorcinol tends to decompose, resinify, and the setting properties of the hexamethylenetetramine-resorcinol compound are materially reduced, this tendency to decompose and the reduction of effective setting properties of the hexamethylenetetramine-resorcinol compound being greater as the storage temperature increases above 100° F.; and as the temperature increases to 150° F. there is substantial decomposition. While the setting agent can be used after it has been subjected to such a temperature, it does not function very efficiently.

During the drying process, the crystalline compound is usually dried at a temperature below 60° C., and the drying temperature may be as low as 5° C., but there is no advantage in using this lower temperature. The best results are obtained when the drying temperature varies from about 40° C. to 60° C., and the period of drying at this temperature range preferably varies from 24 to 48 hours. Obviously, the time of drying is not critical and may vary considerably. Higher drying temperatures may be used, but the chemical addition product should not be decomposed and/or resinified.

It is desired to point out that in the preparation of the chemical addition product of hexamethylenetetramine and resorcinol, in order for the operation to proceed most economically, the separated liquor may be recovered and re-used in place of the water initially used in preparing solutions A and B, further water being used to make up any solvent deficiency. Operating in this manner, yields of 84 to 90% or higher may be obtained in a sustained run.

A series of runs utilizing the procedure above set forth gave the following yields:

*Table II*

|  | Grams |
| --- | --- |
| Run 1 | 109 |
| Run 2 | 261 |
| Run 3 | 230 |
| Run 4 | 226 |
| Run 5 | 234 |
| Total yield | 1,060 |

It may be observed from the above that the total yield is 1,060 grams and that the total possible theoretical yield, that is, five times the total weight of the ingredients in each run, namely, 246 grams, is 1,230 grams. The actual yield, therefore, is about 86% of the theoretical yield. Beginning with the third run, the yield in each run levels off at about approximately 90%.

While a temperature of 15° to 25° C. has been used as a suitable solution temperature for the preparation of solutions A and B, it may be pointed out that this is by way of illustration rather than by way of limitation, it being well known that both the crystalline structure and yield will vary with the temperature of the precipitating medium. Experiments show that higher solution temperatures give lower yields, and solution temperatures lower than 15° to 25° C. give somewhat higher yields. However, the increase in yield at temperatures lower than 15° to 25° C. does not balance the cost of maintaining these lower temperatures.

It may be pointed out that unless the proportions previously set forth are rigidly observed precipitation will occur in solution A or solution B prior to being mixed, to thereby produce a non-uniform chemical addition setting product during the crystallizing step. Therefore, when recycling the mother liquid the proportions set forth are critical. However, if for any reason the yield is not of paramount importance then the proportions may be greatly varied, and the prior art methods may be used, including that of Moschatos and Pollens.

While solution A or solution B have a concentration of hexamethylenetetramine and resorcinol respectively varying from about 20% to about 25%, this concentration may be varied over a rather wide range and still produce a fairly satisfactory setting compound. However, when solutions A and B are more concentrated and depart from concentrations greater than about 25%, the precipitated chemical addition product becomes so stiff as to be difficult to pump and handle. On the other hand, when solutions diluted beyond about 20% are employed, the product yield falls off because of the solubility in water of the chemical addition product of hexamethylenetetramine and resorcinol. Therefore, broadly stated, the upper limit of concentration for each solution should be that which produces a flowable chemical addition product which may be easily pumped and handled, and the lower limit of concentration is that which substantially inhibits solubility of the chemical addition product of hexamethylenetetramine and resorcinol in water.

It is desired to point out that in utilizing hexamethylenetetramine-resorcinol as a setting agent in accordance with the present invention, it has been discovered that in order to obtain the desired speed of cure and the lowering of the curing temperature, a minimum quantity of the addition product of hexamethylenetetramine with resorcinol must be used. More specifically, for the most efficient and satisfactory results the minimum is about 12% to about 18% of setting agent, and preferably about 14% to about 16%. That is, for 100 parts of resin compound, the two-stage phenolic resin comprises about 84 to about 86 parts by weight, while the setting agent comprises about 16 to about 14 parts by weight. This percentage range for the herein described hexamethylenetetramine-resorcinol compound setting agent may be considered critical.

It may be pointed out that it is highly desirable that the speed of cure be developed in the rolling or compounding of the molding powder where the setting agent is used in a molding composition. As is customary in the art, the phenolic-aldehyde resin and the setting agent are mixed with a filler, which may be sawdust, a lubricant, and other miscellaneous ingredients of a normal molding powder. This material is placed on the rolls and rolled or compounded in the customary manner.

Referring to Fig. 1, if a molding compound containing 15% of the chemical addition product of hexamethylenetetramine and resorcinol is rolled for 2 minutes at 127.5° C. it will be approximately two-thirds cured, whereas a compound containing 15% of hexamethylenetetramine only and which is rolled for 2 minutes only in an identical mix at 127.5° C. is only one-third cured.

The above figures indicate that at a temperature of 127.5° C. the setting action of the hexamethylenetetramine-resorcinol addition product is substantially twice as fast as the setting action of hexamethylenetetramine. The extent to which the molding powder is cured on the rolls may be evidenced by a dry rubbing test on the usual hot plate.

At 155° C. the rolled compound containing the hexamethylenetetramine-resorcinol addition product will require only about 20 seconds to cure, while an identical compound with the exception that hexamethylenetetramine has been substituted for the chemical addition product of hexamethylenetetramine-resorcinol will require 40 to 45 seconds to cure at the same temperature. In other words, during the rolling or compounding of the molding powder in which there is present as a setting agent the hexamethylenetetramine-resorcinol compound, at an exceedingly low temperature, namely, 127.5° C., two-thirds of the cure is accomplished, and if hexamethylenetetramine is substituted in an identical compound and rolled under identical conditions the compound will be only one-third cured, leaving most of the curing cycle to be accomplished during the molding step. 127.5° C. has been selected merely for the purpose of illustration. It is clear from Fig. 1 that similar advantages are obtained at other temperatures when the hexamethylenetetramine-resorcinol compound is used for setting purposes instead of hexamethylenetetramine, the advantages being more pronounced at lower temperatures than at higher temperatures, this also clearly appearing from Fig. 1.

It is also highly desirable that the resin formulation be such as to insure a proper flow of the resin compound during the molding operation. Because of the greater degree of advancement during the rolling cycle when employing the setting agent of the present invention, the resin compound has considerably less flow in the molding operation than when the same resin is compounded with hexamethylenetetramine alone as the setting agent and molded under the same conditions. Therefore, an initially more fluid two-stage phenolic resin should be employed when using the hexamethylenetetramine-resorcinol setting agent, or, in lieu thereof, the compound should have present a plasticizer in an amount which will confer upon the resin compound the same properties of flow which the compound would have at the same temperature utilizing hexamethylenetetramine alone as the setting agent, so that the mold cavity will be properly filled before the curing step advances the resin compound below its flow point.

It is clear from the above that it is therefore desirable that the setting agent of the present invention be utilized in the resin compound in the proper proportion, and that in conjunction therewith the rolling operation be carried out at correct compounding times and temperature, and further that the two-stage phenolic resin compound be correctly formulated so as to impart thereto flow properties before the curing advances the resin beyond its flow stage. When all of these factors are properly adjusted, phenolic molding compounds may be cured in as little as 50% of the time cycles now used in the phenolic molding art, thereby doubling the capacity of expensive equipment.

It may further be stated that the curing range is usually preferably between 135° and 155° C. and most commonly between 140° and 150° C., in order that the case-hardening of the molded piece may be avoided. It has been discovered that when molding compounds containing a hexamethylenetetramine-resorcinol chemical addition setting agent are molded during fast curing and at too high a temperature, a case-hardened effect is developed, resulting in gas blisters on the surface of the molded article and undercure in the interior of the piece, thereby making it commercially valueless. This case-hardening effect is substantially inhibited or totally eliminated by keeping the upper curing limit at about 155° C. or lower, and preferably between about 135° and about 150° C., and, more commonly, between about 140° C. and about 150° C.

While the present invention has been described utilizing hexamethylenetetramine-resorcinol chemical addition compounds for the setting of two-stage resins of phenol per se, it is to be understood that the setting agent is not limited to phenol per se, but may be used for the setting of any of the prior art monohydroxy phenolic resins, including those produced by the condensation of cresols, xylenols, and cresylic acid with aldehydes, or mixtures of aldehydes, as, for example, acetaldehyde, paraldehyde, propionaldehyde, the butyl aldehydes, the furfuraldehydes, and the like.

While it has been stated that the chemical addition product of hexamethylenetetramine and resorcinol is suitable as a setting agent in the production of molding compositions of the character herein set forth, it may also be used to set monohydric phenolic-aldehyde resins, and especially phenol-formaldehyde resins, irrespective of whether they are or are not used for molding purposes, provided the mixture of the monohydric phenolic resin and the stable chemical addition compound of hexamethylenetetramine-resorcinol is in the dry state. In this connection, it may be pointed out that the presence of a solvent in the phenolic-aldehyde compound which is to be molded or set has a tendency to break down the addition product of hexamethylenetetramine and resorcinol and thereby destroy its effectiveness as a fast setting agent.

The two-stage monohydric phenolic-aldehyde resin, together with the chemical addition product of hexamethylenetetramine and resorcinol, the mixture being in a dry state, may be used to bond plywood or other cellulosic articles, the mixture being sprinkled on and adjacent the "glue line" of the objects to be united, and the resulting assembly then subjected to heat and pressure, as is well known in the art. Further, the dry mixture of the two-stage monohydric phenolic-aldehyde resin, together with the chemical addition product of hexamethylenetetramine and resorcinol may be used in the production of abrasive articles when the wetting agent employed does not break down the chemical addition product of hexamethylenetetramine and resorcinol. The above examples are merely illustrative and are not by way of limitation, as it is obvious that the two-stage monohydric phenolic-aldehyde resins may be utilized in many ways and that they may be set by the chemical addition product of hexamethylenetetramine and resorcinol whenever it is possible to use the resin and the setting agent in a dry state, that is, when there is not sufficient moisture present in either of the components or in the mixture of said materials to break down the chemical addition product of the hexamethylenetetramine and resorcinol.

In the preferred form of the invention, the chemical addition product of hexamethylenetetramine and resorcinol should not contain more than .5% to 2% of moisture. As these figures are departed from, there is some tendency for the addition product to break down on storage. When about 3% of moisture is present, there is some action, and this increases as 4% or 5% of moisture is present. It is not desired to be strictly limited as to the percentage of moisture present, as this will vary with the character of the hexamethylenetetramine and the resorcinol and the methods by which they are produced and dried. The criterion is that there must be no substantial breaking down on storage of the chemical addition product of hexamethylenetetramine and resorcinol.

While the use of the addition product of hexamethylenetetramine and resorcinol as a setting agent is highly desirable in the setting of two-stage monohydric phenolic resins, as, for example, phenol-formaldehyde resin, commonly known in the art as Bakelite, it is within the province of the present invention to set two-stage resins, the predominating phenolic body of which is a monohydric phenol. For example, the present setting agent may be used to set a co-polymer two-stage resin the phenolic body of which comprises 75% monohydric phenol, as, for example, phenol per se and 25% of a dihydric phenol, as, for example, resorcinol, said resins being aldehyde condensation products.

It may be stated that the copolymerized aldehyde resin is not limited to one that has 75% of the monohydric phenolic body. As stated, it is only necessary that this be present in a predominating proportion in order for the chemical addition product of hexamethylenetetramine and resorcinol to speed up the cure. This predominating proportion may be just a little above 50%.

While, as pointed out, in order to obtain efficient and satisfactory results, it is necessary that the chemical addition product of hexamethylenetetramine and resorcinol be present in an amount of at least 12% to 18% and 14% to 16%, it is desired to emphasize that this is the minimum amount of setting agent that must be present in order to achieve satisfactory results and that greater amounts thereof may be used if desired, but only at the sacrifice of economy.

What is claimed is:

1. The substantially insoluble, infusible heat-set resin comprising the reaction product of 82 to 88 parts by weight of a substantially dry permanently fusible monohydric phenol-aldehyde resin and 18 to 12 parts by weight of the substantially dry chemical addition product of hexamethylenetetramine and resorcinol.

2. The substantially insoluble, infusible heat-set resin comprising the reaction product of 84 to 86 parts by weight of a substantially dry permanently fusible monohydric phenol aldehyde-resin and 16 to 14 parts by weight of the substantially dry, stable chemical addition product of hexamethylenetetramine and resorcinol.

3. The method of setting a substantially dry permanently fusible settable monohydric phenol-aldehyde resin comprising heat-reacting 82 to 88 parts by weight of the resin with 18 to 12 parts by weight of the substantially dry, stable chemical addition product of hexamethylenetetramine and resorcinol.

4. The method of setting a substantially dry permanently fusible settable monohydric phenol-aldehyde resin comprising heat-reacting 84 to 86 parts by weight of the resin with 16 to 14 parts by weight of the substantially dry, stable chemical addition product of hexamethylenetetramine and resorcinol.

5. The method of setting a substantially dry permanently fusible settable monohydric phenol-aldehyde resin comprising heat-reacting 82 to 88 parts by weight of the resin with 18 to 12 parts by weight of the substantially dry, stable chemical addition product of hexamethylenetetramine and resorcinol, the reaction being carried out at a temperature varying between about 140° C. and 150° C. whereby case-hardening of the surface of the reacted product is inhibited.

6. The method of setting a substantially dry permanently fusible settable monohydric phenol-aldehyde resin comprising heat-reacting 84 to 86 parts by weight of the resin with 16 to 14 parts by weight of the substantially dry, stable chemical addition product of hexamethylenetetramine and resorcinol, the reaction being carried out at a temperature varying between about 140° C. and 150° C. whereby case-hardening of the surface of the reacted product is inhibited.

7. The method of setting a substantially dry permanently fusible settable monohydric phenol-aldehyde resin comprising heat-reacting 82 to 88 parts by weight of the resin with 18 to 12 parts by weight of the substantially dry, stable chemical addition product of hexamethylenetetramine and resorcinol, the reaction being carried out at a temperature varying between about 135° C. and about 155° C., whereby case-hardening of the reacted product is inhibited.

8. The heat-reactive resinous composition comprising the reaction mixture of 82 to 88 parts by weight of a substantially dry permanently fusible monohydric phenol-aldehyde resin and 18 to 12 parts by weight of the substantially dry chemical addition product of hexamethylenetetramine and resorcinol.

9. The heat-reactive resinous composition comprising the reaction mixture of 84 to 86 parts by weight of a substantially dry permanently fusible monohydric phenol-aldehyde resin and 16 to 14 parts by weight of the substantially dry chemical addition product of hexamethylenetetramine and resorcinol.

10. The method of setting a substantially dry, permanently fusible, settable copolymer phenol-aldehyde resin, the phenolic body of which comprises about 75% of a monohydric phenol and about 25% of a dihydric phenol, comprising heat-reacting 82 to 88 parts by weight of said copolymer resin with 18 to 12 parts by weight of the substantially dry, stable addition product of hexamethylenetetramine and resorcinol.

11. The method of setting a substantially dry, settable copolymer phenolic resin containing a predominating proportion of a permanently fusible, monohydric phenol-aldehyde resin together with a permanently fusible dihydric phenol aldehyde resin, comprising heat-reacting 82 to 88 parts by weight of said copolymer phenolic resin with 18 to 12 parts by weight of the substantially dry, stable chemical addition product of hexamethylenetetramine and resorcinol.

PHILIP H. RHODES.